(12) United States Patent
Newsom et al.

(10) Patent No.: US 11,205,321 B2
(45) Date of Patent: *Dec. 21, 2021

(54) SYSTEM AND METHOD FOR REDEEMING CASHLESS GAMING TICKETS TO BANK ACCOUNTS VIA MULTIFUNCTION ATM

(71) Applicant: Everi Payments Inc., Austin, TX (US)

(72) Inventors: Victor Newsom, Las Vegas, NV (US); Richard Beer, Prior Lake, MN (US); Craig Potts, Henderson, NV (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,570

(22) Filed: Sep. 14, 2020

(65) Prior Publication Data

US 2020/0410817 A1 Dec. 31, 2020

Related U.S. Application Data

(63) Continuation-in-part of application No. 16/379,543, filed on Apr. 9, 2019, now Pat. No. 10,839,647,
(Continued)

(51) Int. Cl.
*G07F 17/32* (2006.01)
*A63F 3/00* (2006.01)
*G07F 19/00* (2006.01)

(52) U.S. Cl.
CPC ...... *G07F 17/3248* (2013.01); *A63F 3/00157* (2013.01); *G07F 17/32* (2013.01);
(Continued)

(58) Field of Classification Search
CPC ...... G07F 19/203; G07F 19/20; G07F 19/211; G07F 19/202; G06Q 20/045
See application file for complete search history.

(56) References Cited

U.S. PATENT DOCUMENTS 4,689,742 A 8/1987 Troy et al.
4,764,666 A 8/1988 Bergeron
(Continued)

FOREIGN PATENT DOCUMENTS

EP 1 107 196 6/2001
GB 2 380 687 4/2003
(Continued)

OTHER PUBLICATIONS

Quinn, William, "Worth Their Weight in Gold," pp. 24-26, Global Gaming Business, Apr. 1, 2003.
(Continued)

*Primary Examiner* — Seng H Lim
(74) *Attorney, Agent, or Firm* — Weide & Miller, Ltd.

(57) ABSTRACT

A system and method are provided for redeeming cashless gaming tickets having associated monetary value, such as issued at a cash-out from a gaming machine in a casino. When the customer wishes to redeem the ticket, the ticket is introduced to a multi-function ATM. The ATM then electronically communicates with a ticket redemption system to validate the ticket. The customer may transfer the monetary value associated with the ticket to an account associated with a presented bank card, wherein the ATM transmits a request for transfer to a financial server which transmits a request to a financial network for crediting of the monetary value (such as less a transaction fee) to the customer's bank card account.

20 Claims, 9 Drawing Sheets

Related U.S. Application Data which is a continuation of application No. 15/137,693, filed on Apr. 25, 2016, now Pat. No. 10,275,983, which is a continuation of application No. 14/051,156, filed on Oct. 10, 2013, now Pat. No. 9,324,210, which is a continuation of application No. 10/956,644, filed on Oct. 1, 2004, now Pat. No. 8,556,707.

(60) Provisional application No. 60/508,063, filed on Oct. 1, 2003.

(52) U.S. Cl.
CPC ...... *G07F 17/3225* (2013.01); *G07F 17/3244* (2013.01); *G07F 17/3246* (2013.01); *G07F 17/3255* (2013.01); *G07F 19/00* (2013.01); *G07F 19/20* (2013.01); *G07F 19/203* (2013.01)

(56) References Cited

U.S. PATENT DOCUMENTS

| | | |
|---|---|---|
| 4,882,473 A | 11/1989 | Bergeron et al. |
| 5,038,022 A | 8/1991 | Lucero |
| 5,179,517 A | 1/1993 | Sarbin et al. |
| 5,265,874 A | 11/1993 | Dickinson et al. |
| 5,429,361 A | 7/1995 | Raven et al. |
| 5,457,306 A | 10/1995 | Lucero |
| 5,470,079 A | 11/1995 | LeStrange et al. |
| 5,642,160 A | 6/1997 | Bennett |
| 5,663,546 A | 9/1997 | Cucinotta et al. |
| 5,679,938 A | 10/1997 | Templeton et al. |
| 5,741,183 A | 4/1998 | Acres et al. |
| 5,754,655 A | 5/1998 | Hughes et al. |
| 5,766,075 A | 6/1998 | Cook et al. |
| 5,770,533 A | 6/1998 | Franchi |
| 5,864,623 A | 1/1999 | Messina et al. |
| 5,902,983 A | 5/1999 | Crevelt et al. |
| 5,919,091 A | 7/1999 | Bell et al. |
| 5,959,277 A | 9/1999 | Lucero |
| 5,991,410 A | 11/1999 | Albert et al. |
| 5,999,624 A | 12/1999 | Hopkins |
| 6,001,016 A | 12/1999 | Walker et al. |
| 6,048,269 A | 4/2000 | Burns et al. |
| 6,048,271 A | 4/2000 | Barcelou |
| 6,064,987 A | 5/2000 | Walker et al. |
| 6,081,792 A | 6/2000 | Cucinotta et al. |
| 6,124,947 A | 9/2000 | Seo |
| 6,162,122 A | 12/2000 | Acres et al. |
| 6,168,522 B1 | 1/2001 | Walker et al. |
| 6,244,958 B1 | 6/2001 | Acres |
| 6,275,991 B1 | 8/2001 | Erlin |
| 6,293,866 B1 | 9/2001 | Walker et al. |
| 6,302,793 B1 | 10/2001 | Fertitta, III et al. |
| 6,347,738 B1 | 2/2002 | Crevelt et al. |
| 6,352,205 B1 | 3/2002 | Mullins et al. |
| 6,361,437 B1 | 3/2002 | Walker et al. |
| 6,409,595 B1 | 6/2002 | Uihlein et al. |
| 6,431,983 B2 | 8/2002 | Acres |
| RE37,885 E | 10/2002 | Acres et al. |
| 6,486,768 B1 | 11/2002 | French et al. |
| 6,487,284 B1 | 11/2002 | Campbell |
| 6,505,772 B1 | 1/2003 | Mollett et al. |
| 6,547,131 B1 | 4/2003 | Foodman et al. |
| 6,575,832 B1 | 6/2003 | Manfredi et al. |
| 6,579,179 B2 | 6/2003 | Poole et al. |
| 6,585,598 B2 | 7/2003 | Nguyen et al. |
| 6,601,040 B1 | 7/2003 | Kolls |
| 6,607,441 B1 | 8/2003 | Acres |
| 6,675,152 B1 | 1/2004 | Prasad et al. |
| 6,682,421 B1 | 1/2004 | Rowe et al. |
| 6,709,333 B1 | 3/2004 | Bradford et al. |
| 6,739,972 B2 | 5/2004 | Flanagan-Parks et al. |
| 6,800,029 B2 | 10/2004 | Rowe et al. |
| 6,843,412 B1 | 1/2005 | Sanford |
| 6,846,238 B2 | 1/2005 | Wells |
| 6,852,031 B1 | 2/2005 | Rowe |
| 6,866,586 B2 | 3/2005 | Oberberger et al. |
| 6,890,258 B2 | 5/2005 | Weiss |
| 6,951,302 B2 | 10/2005 | Potts |
| 6,997,807 B2 | 2/2006 | Weiss |
| 7,003,496 B2 | 2/2006 | Ishii et al. |
| 7,168,089 B2 | 1/2007 | Nguyen et al. |
| 7,366,695 B1 | 4/2008 | Allen-Rouman et al. |
| 8,096,872 B2 | 1/2012 | Walker et al. |
| 8,556,707 B2 | 10/2013 | Potts et al. |
| 2001/0022849 A1 | 9/2001 | Simonoff |
| 2002/0002075 A1 | 1/2002 | Rowe |
| 2002/0039923 A1 | 4/2002 | Cannon et al. |
| 2002/0045476 A1 | 4/2002 | Poole et al. |
| 2002/0104878 A1 | 8/2002 | Seifert et al. |
| 2002/0107072 A1 | 8/2002 | Giobbi |
| 2002/0132664 A1 | 9/2002 | Miller et al. |
| 2002/0147047 A1 | 10/2002 | Letovsky et al. |
| 2002/0177479 A1 | 11/2002 | Walker et al. |
| 2003/0004876 A1 | 1/2003 | Jacobson |
| 2003/0033534 A1 | 2/2003 | Rand et al. |
| 2003/0036425 A1 | 2/2003 | Kaminkow et al. |
| 2003/0045353 A1 | 3/2003 | Paulsen et al. |
| 2003/0078094 A1 | 4/2003 | Gatto et al. |
| 2003/0087692 A1 | 5/2003 | Weiss |
| 2003/0104865 A1 | 6/2003 | Itkis et al. |
| 2003/0106769 A1 | 6/2003 | Weiss |
| 2003/0176218 A1 | 9/2003 | LeMay et al. |
| 2003/0186747 A1 | 10/2003 | Nguyen et al. |
| 2003/0211883 A1 | 11/2003 | Potts |
| 2003/0222153 A1 | 12/2003 | Pentz et al. |
| 2003/0228902 A1 | 12/2003 | Walker et al. |
| 2003/0236749 A1 | 12/2003 | Shergalis |
| 2004/0053693 A1 | 3/2004 | An |
| 2004/0173673 A1 | 9/2004 | Potts |
| 2004/0214643 A1 | 10/2004 | Parrott et al. |
| 2004/0229671 A1 | 11/2004 | Stronach et al. |
| 2005/0009600 A1 | 1/2005 | Rowe et al. |
| 2005/0015332 A1 | 1/2005 | Chen |
| 2005/0054417 A1 | 3/2005 | Parrott et al. |
| 2005/0054446 A1 | 3/2005 | Kammler et al. |
| 2005/0080728 A1 | 4/2005 | Sobek |
| 2005/0096124 A1 | 5/2005 | Stronach |
| 2005/0107155 A1 | 5/2005 | Potts et al. |
| 2005/0107156 A1 | 5/2005 | Potts et al. |
| 2006/0131395 A1 | 6/2006 | Potts et al. |
| 2006/0148559 A1 | 7/2006 | Jordan et al. |
| 2006/0160610 A1 | 7/2006 | Potts |
| 2007/0060309 A1 | 3/2007 | Yankton et al. |
| 2007/0066386 A1 | 3/2007 | Shields |
| 2007/0213124 A1 | 9/2007 | Walker et al. |
| 2009/0029763 A1 | 1/2009 | Schwartz |
| 2009/0048973 A1 | 2/2009 | DeCristoforo |
| 2009/0065573 A1 | 3/2009 | Potts et al. |
| 2011/0231314 A1 | 9/2011 | Sears et al. |
| 2016/0071373 A1* | 3/2016 | Anderson ........... G07F 17/3239 463/25 |

FOREIGN PATENT DOCUMENTS

| | | |
|---|---|---|
| WO | 93/23817 | 11/1993 |
| WO | 94/16781 | 8/1994 |
| WO | 97/13228 | 4/1997 |
| WO | 01/57617 | 8/2001 |

OTHER PUBLICATIONS

AAMVA National Standard for the Driver License/Identification Card, AAMVA DL/ID-2000, American Association of Motor Vehicle Administrators, pp. 1-90, Jun. 30, 2000.

International Search Report and Written Opinion for International Application No. PCT/US04/32358, filing date Oct. 1, 2004, dated Feb. 26, 2007.

(56) References Cited

OTHER PUBLICATIONS

PSP Lab, What is original credit transaction (OCT)? Visa and Mastercard, https://psplab.com/kb/what-is-original-credit-transaction-oct/, dated Sep. 7, 2020, 3 pages.

* cited by examiner

SYSTEM AND METHOD FOR REDEEMING CASHLESS GAMING TICKETS TO BANK ACCOUNTS VIA MULTIFUNCTION ATM

RELATED APPLICATION DATA

This application is a continuation-in-part of U.S. application Ser. No. 16/379,543, filed Apr. 9, 2019, which is a continuation of U.S. application Ser. No. 15/137,693, filed Apr. 25, 2016, now U.S. Pat. No. 10,275,983, which is a continuation of U.S. patent application Ser. No. 14/051,156, filed Oct. 10, 2013, now U.S. Pat. No. 9,324,210, which is a continuation of U.S. patent application Ser. No. 10/956,644, filed Oct. 1, 2004, now U.S. Pat. No. 8,556,707, which claims priority to U.S. Provisional Application Ser. No. 60/508,063, filed Oct. 1, 2003, which prior applications are incorporated by reference as if set forth fully herein.

FIELD OF THE INVENTION

The present application relates to systems and methods for redeeming value tickets.

BACKGROUND OF THE INVENTION

The present invention relates to a system and method for performing ticket redemption transactions for a customer. Specifically, the invention relates to a system and method, used in a variety of environments including casinos, to facilitate cashless gaming. A gaming device, such as a slot machine, will issue a ticket rather than cash or coin, which is then redeemable by the customer through various mediums, such as a casino cashier or multi-function cashless gaming Automated Teller Machine, or ATM.

Because casinos have an interest in maintaining a high level of customer satisfaction, it is advantageous to provide customers with the ability to easily and effectively manage their winnings in a manner that empowers them to quickly collect their money in a form of their choosing. However, existing redemption methods require numerous steps and other burdens. Therefore, there is a need for a system and method of redeeming a customer's winnings in a prompt and seamless manner that provides the customer with the flexibility of deciding how and when to collect the money.

SUMMARY OF THE INVENTION

The present invention generally relates to a system and method for allowing a customer to redeem his or her winnings from a gaming machine, such as a slot machine, in a casino environment. After a player has accrued winnings at a gaming machine and has finished playing, the player indicates to the machine that he or she is ready to cash out. Rather than issuing cash, the method of the present invention includes issuing the customer a unique ticket that is associated with the amount the customer has won. This "cashless gaming" aspect of the present invention avoids issuing the player burdensome coins to lug about the casino. Then, at the player's convenience, the ticket is introduced into a multi-function cashless gaming ATM for redemption. Further objects, features, and advantages of the present invention over the prior art will become apparent from the detailed description of the drawings which follows, when considered with the attached figures.

The multi-function ATM is configured to perform traditional transactions such as cash withdrawal, credit/debit card cash advance transactions, and electronic fund transfers. The ATM of the present invention also provides for the additional task of ticket redemption transactions. The ticket includes encoded data, such as a barcode, which is read by the multi-function ATM as the ticket is introduced. The ticket may be introduced by a number of methods, such as swiping it through a ticket reader on the ATM. The encoded data on the ticket is electronically processed by the multi-function ATM to retrieve the information represented by the data. For instance, where the encoded data is a barcode the information retrieved is a number, or another unique identifier, represented by the barcode.

Once the number, or another unique identifier stored on the ticket, has been retrieved, the ATM validates the ticket. The unique identifier is verified against a redemption ticket database, which indicates whether the ticket has been previously redeemed. If the ticket has not yet been redeemed, the procedure continues. The redemption ticket database also stores multiple identifiers and associates each identifier with a predetermined dollar value based on players' winnings at various gaming machines. Once the redemption ticket database determines the predetermined dollar value associated with the specific identifier on the player's ticket, the dollar value is returned to the multi-function ATM.

Upon verifying that the ticket is valid and receiving the predetermined dollar value, the multi-function ATM transfers an award to the player that is equal to the predetermined dollar value associated with the ticket. If the system collects a commission for performing the redemption transaction, the award amount may be reduced by the commission fee. The player can select a redemption type for receiving the award, such as cash, credit, or deposit. Where the selected redemption type is cash, the multi-function ATM dispenses cash to the player that is equal to the predetermined dollar value, less applicable fees. Once the multi-function ATM has transferred the award to the player, the redemption ticket database is updated to indicate that the redemption ticket has been redeemed. Accordingly, an attempt to subsequently redeem the same ticket again will fail.

In another aspect of the present invention, the selected redemption type is credit. The player introduces his or her credit card into the multi-function ATM, and the credit card is then electronically processed. The ATM retrieves the machine readable information stored on the credit card, and electronically issues a credit request to a credit card authorization server. The credit request utilizes the machine readable information stored on the credit card and the predetermined dollar value as the basis of the request. If the request is approved, a credit card account, which is associated with the credit card, is credited an appropriate amount.

In yet another aspect of the present invention, the selected redemption type is deposit. The player introduces his or her ATM card into the multi-function ATM, and the ATM card is then electronically processed. The ATM retrieves the machine readable information stored on the ATM card and electronically issues a deposit request. The deposit request utilizes the machine readable information stored on the ATM card and the predetermined dollar value as the basis of the request. If the request is approved, a deposit is made in an appropriate amount to a banking account that is associated with the ATM card.

In one embodiment of a system and method for facilitating redemption of monetary value associated with a presented cashless gaming ticket to an account associated with a bank card, the system includes the ATM and a financial server. The ATM is configured to transmit a ticket validation request to a ticket redemption system in response to presentation of a cashless gaming ticket to the ATM by a user and when the cashless gaming ticket is validated and the ATM has received a request by the user to transfer the monetary value to a bank card account associated with a presented bank card, to read the bank card and transmit a request to transfer the monetary value associated with the cashless gaming ticket to the bank card account. The financial server is configured to receive the request to transfer monetary value from the ATM, to transmit to a financial network a request for the monetary value less a transaction fee to be credited to the bank card account of the user, to receive confirmation that the credit is applied to the bank card account, and when the confirmation is received, to cause the ATM to indicate to the user that the credit was successfully applied to the bank card account.

In one embodiment, the financial server transmits the request for the monetary value less the transaction fee to be credited via a financial gateway to an issuing bank associated with the bank card account. The request may be made via merchant category code 7995.

In another embodiment, the financial server transmits the request for the monetary value less the transaction fee to be credited to a processing bank which creates a wallet account for the transaction and transfers funds from the wallet account to an issuing bank associated with the bank card account. The request to transfer of funds from the wallet account to the issuing bank may be made via merchant category code 6012.

In addition, another aspect of the present invention allows a customer to use a player tracking card ("PTC") to receive cash or credit from the multi-function ATM based on the points accumulated by the cardholder and associated with the PTC. It is common for casinos to issue player tracking cards, which are used to track players' activities in the casino and award points for certain actions. Typically, the points can be redeemed for a variety of goods and services, such as free or discounted meals, hotel accommodations, and gift shop items. In the system of the present invention, the points accumulated by a player can also be redeemed by the multi-function ATM for cash or credit. This process is similar to redeeming a redemption ticket, only rather than introducing a ticket to the ATM, the player introduces his or her PTC to the ATM. The ATM decodes the magnetic strip on the PTC, retrieves the associated player and point information, and redeems the points for the appropriate cash or credit.

DETAILED DESCRIPTION OF THE INVENTION

Figure 1:
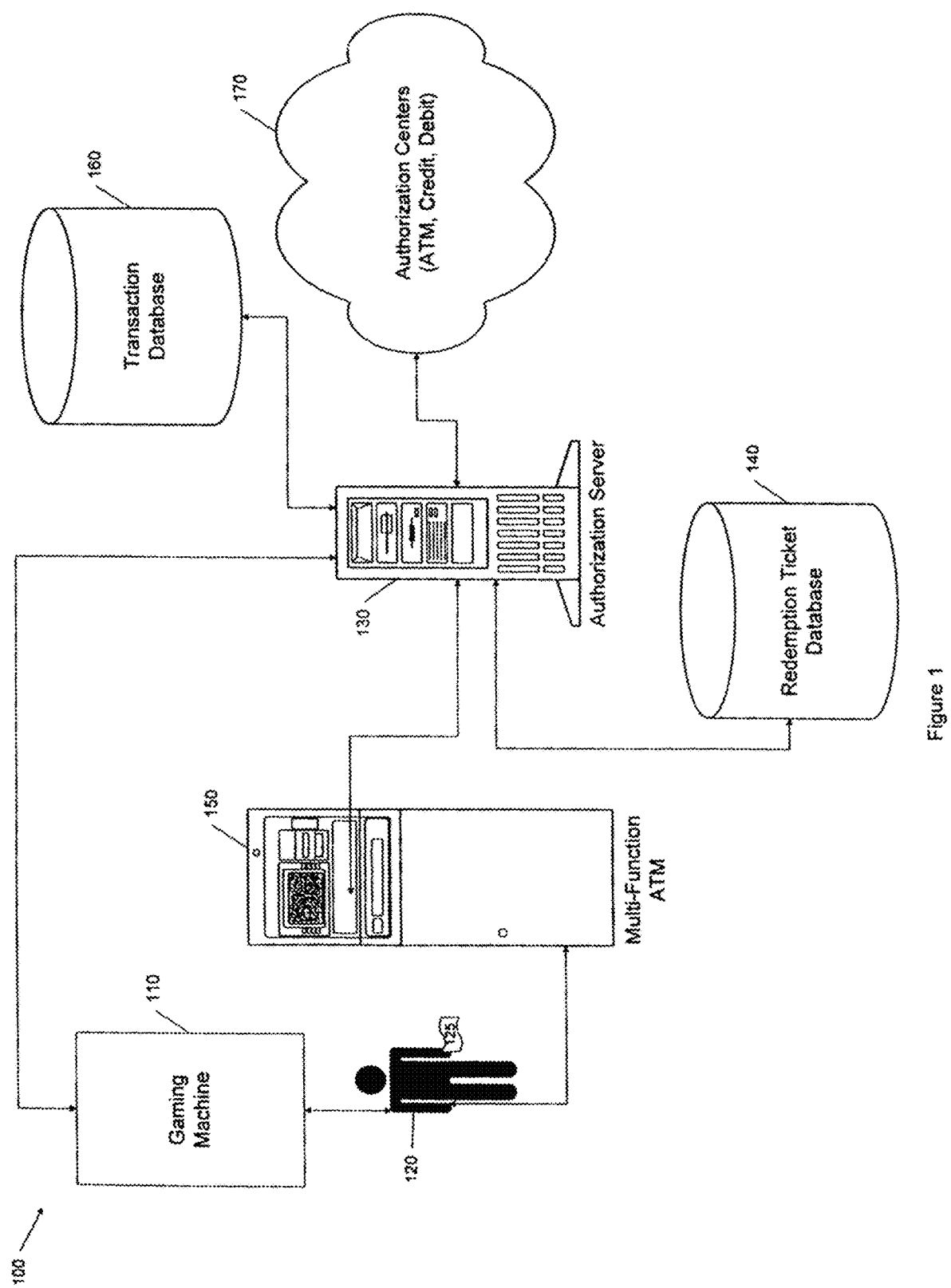
FIG. 1 is a block diagram of a cashless gaming ticket redemption transaction system in accordance with an embodiment of the present invention.

One embodiment of a cashless gaming ticket redemption transaction system 100 is shown in FIG. 1. In a preferred embodiment, the cashless gaming ticket redemption transaction system 100, which contains the elements described herein, is operated in a casino environment. The system 100 includes a plurality of gaming machines 110 and players 120 who play and interact with the gaming machines. The gaming machines 110 are configured to issue cashless gaming tickets 125, or "redemption tickets," to the players 120 based on the players' winnings as described in more detail below. Each ticket 125 issued by a gaming machine 110 includes an encoded unique identifier. The gaming machines also communicate with an authorization server 130 to transmit information relating to the cashless gaming tickets 125 and the players' winnings. The authorization server 130 stores a subset of the information it receives on a redemption ticket database 140 for subsequent retrieval.

As described in more detail below, a player 120 that has been issued a ticket 125 can bring the ticket to a multi-function ATM 150. The player interacts with the ATM 150 through any methods known in the art such as buttons and touch-sensitive screens. The ATM 150 is configured to perform traditional transactions such as cash withdrawal, credit/debit transactions, and electronic fund transfers. These operations are well known in the art and are not elaborated on herein. The ATM 150 of the present invention is also configured to perform ticket redemption transactions. Accordingly, the ATM 150 reads, validates, and processes the ticket 125 to redeem the player's winnings.

To perform these functions, the ATM 150 communicates with the authorization server 130. The authorization server 130 in turn communicates with the redemption ticket database to validate the ticket 125 and retrieve information about the associated winnings. The redemption ticket database 140 stores multiple unique identifiers, each representing a redemption ticket issued to a player, and associates each identifier with a predetermined dollar value based on players' winnings at various gaming machines. The authorization server 130 many also communicate with various authorization centers 170 for redemption to credit card accounts and checking/savings accounts. It will be appreciated that the authorization server 130 may comprise more than one server or device. For example, a first authorization server might comprise a cashless ticketing server which is configured to generate cashless gaming ticket information and to receive and validate cashless ticket redemption requests, and a second authorization server might comprise a financial transaction server which is configured to receive requests for deposit of funds associated with a cashless gaming ticket to a financial account of the player 120.

The redemption transactions that are performed on the multi-function ATM 150 and the authorization server 130 are tracked and stored on a transaction database 160. In one embodiment, the customer transaction history on the transaction database 160 for specific customers can be accessed by the authorization server 130. In this embodiment, the customer must identify himself or herself to the ATM, for instance, by introducing a casino-issued "player tracking" or VIP card to the ATM that uniquely identifies the customer. The transaction database 160 can also store additional information regarding customers' credit history as well as marketing information. When a commission is collected for utilizing the cashless gaming ticket redemption transaction system 100, the appropriate commission information for each player is also stored on the transaction database 160 as well as commission fee overrides for certain players such as VIP's.

Figure 2:
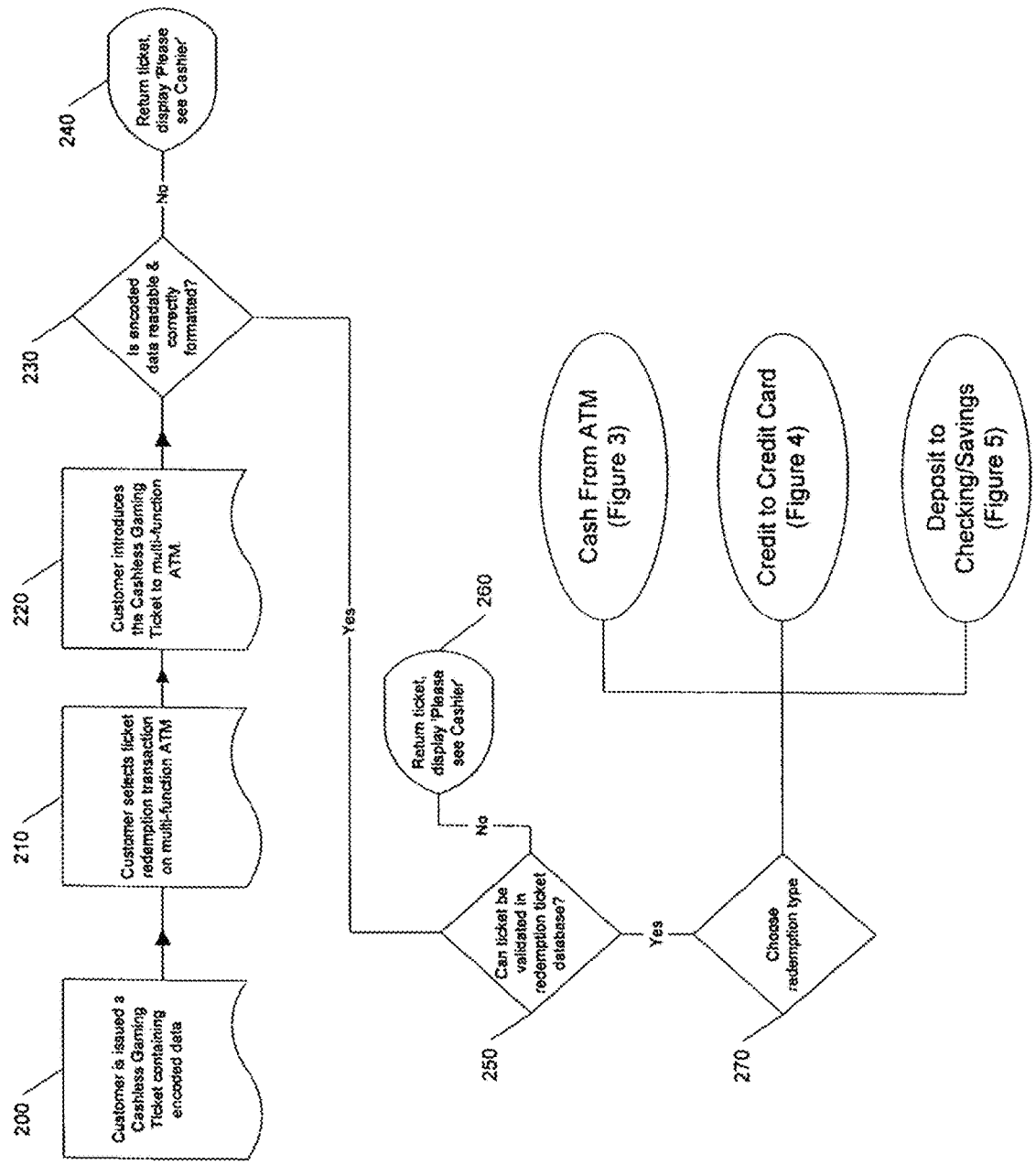
FIG. 2 is a flow diagram of a method for initiating a ticket redemption transaction on a multi-function ATM in accordance with the present invention.

In operation, and with reference to FIGS. 1 and 2, after a player 120 has accrued winnings at the gaming machine 120 and has finished playing, the player 120 indicates to the gaming machine 110 that he or she is ready to cash out. In response, the gaming machine 110 at step 200 issues the player 120 a unique cashless gaming ticket 125. The ticket 125 includes encoded data that represents a unique identifier for the ticket 125. In one embodiment, the encoded data is a barcode that represents a unique number, which is the unique identifier associated with that ticket.

The gaming machine 110 also transmits pertinent winnings information to the authorization server 130, as shown in FIG. 1. That information may include the dollar value of the winnings accrued by the player 120 while playing on the gaming machine 120 as well as the unique identifier for the ticket 125 that is issued to the player 120. The authorization server 130 stores the information it receives from the gaming machine 110 on the redemption ticket database 140. The redemption ticket database 140 stores and associates the player's winnings with the unique identifier.

At the player's convenience, he or she can take the ticket 125 to the multi-function cashless gaming ATM 150, which, in the preferred embodiment, is also located in the casino environment. Because the ATM 150 performs multiple types of transactions, the player selects a "redemption" transaction on the ATM 150 at step 210. At step 220, the player 120 introduces the ticket 125 into the multi-function ATM 150 for redemption. The ATM 150 may accept the ticket through a variety of means, such as a ticket reader (not shown) as is known in the art. In one embodiment, the ticket 125 may be swiped through the ticket reader. As the ticket 125 is introduced, the ATM 150 attempts to read the encoded data.

At step 230, the ATM 150 determines whether the encoded data is readable and correctly formatted. At step 240, if the encoded data is unreadable or the format is not recognizable, the transaction fails and the ATM 150 displays an error message to the player 120, indicating that the player 120 should see the cashier (not shown) at the casino. If the encoded data is readable and correctly formatted, the data is electronically processed by the multi-function ATM 150 to retrieve the information represented by the encoded data. In one embodiment, the encoded data is a barcode and the information retrieved from the ticket 125 is the unique number represented by that barcode.

Once the number, or another unique identifier stored on the ticket 125, has been processed, the ATM 150 validates the ticket 125 at step 250. The unique identifier is verified against the redemption ticket database 140. The ATM 150 communicates with the authorization server 130, which in turn communicates and issues queries to the redemption ticket database 140. The data from the redemption ticket database 140 is communicated to the authorization server 130 and then transmitted back to the ATM 150. At step 260, if the ticket 125 cannot be verified against the redemption ticket database 140, the transaction fails and the ATM 150 displays an error message to the player 120, indicating that the player 120 should see the cashier (not shown) at the casino.

If the ticket 125 is successfully validated, the ATM 150 prompts the player with the choice of transaction types for redeeming the winnings at step 270. In one embodiment, the transaction types include "Cash from ATM," "Credit to Credit Card," and "Deposit to Checking/Savings Account."

Figure 3:
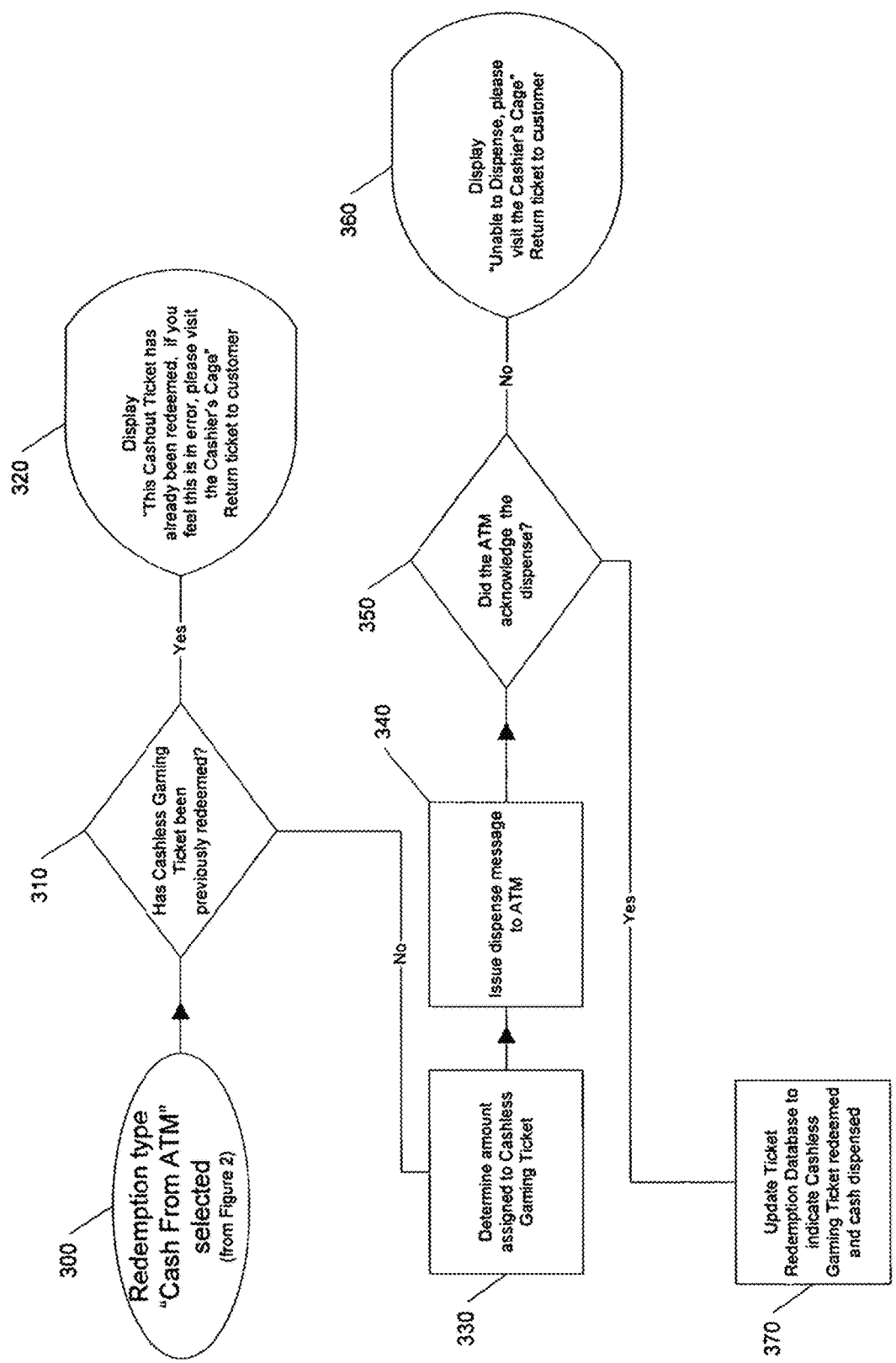
FIG. 3 is a flow diagram of a method for completing a ticket redemption transaction with a cash redemption in accordance with the present invention.

With reference to FIGS. 1 and 3, if the player 120 selects the redemption type "Cash from ATM," step 300, the ATM 150 proceeds with a cash redemption. The ATM 150 verifies whether the ticket 125 has been previously redeemed, step 310, by communicating with the redemption ticket database 140 through the authorization server 130. The redemption ticket database 140 maintains redemption data for each ticket and transmits to the ATM 150 verification of whether the ticket 125 has been redeemed.

At step 320, if the ticket 125 has been previously redeemed, the ATM 150 displays a message to the player 120 indicating the previous redemption and that the player 120 may see the cashier (not shown) if the player believes an error has occurred. If the ticket 125 has not been previously redeemed, the ATM proceeds with the transaction by determining the player's winnings and the amount that will be awarded, step 330.

To ascertain this amount, the ATM 150 communicates with the authorization server 130, which queries the redemption ticket database 140. As previously described, the redemption ticket database 140 stores and associates information relating to the tickets 125 and the players' winnings. The redemption ticket database returns to the authorization server 130 the winnings associated with the ticket 125. In one embodiment, the ticket 125 contains winning value, which is confirmed against the redemption ticket database. The authorization server 130 then determines the amount to be redeemed, which is typically the player's winnings minus a commission or transaction fee. The appropriate commission may be determined based on the specific player redeeming the ticket. A player profile (not shown) may be stored on the transaction database 160, which indicates the player's preference level. For instance, while a new player may have a standard commission taken out of the winnings, a VIP player may have the commission waived altogether based on the player profile.

Once the winnings associated with the ticket 125, less the commission if any, has been established, the authorization sever 130 transmits this redemption value to the ATM 150. At step 340, the authorization server 130 issues a dispense message for the ATM 150 to dispense the appropriate redemption value to the player 120 in cash. In response to the message, the ATM 150 attempts to dispense the redemption amount in cash. At step 350, the authorization server 130 determines whether the ATM 150 acknowledges the dispense message. At step 360, if the ATM does not acknowledge the dispense message, the transaction fails, and the ATM 150 displays an error message to the player 120 that the ATM is unable to dispense the cash and that the player should see the cashier. At step 370, if the ATM does acknowledge the dispense message, the authorization server 130 updates the redemption ticket database 140 to indicate that the ticket 125 has been redeemed and the cash has been dispensed, thereby completing the cash redemption of the cashless gaming ticket 125.

Figure 4:
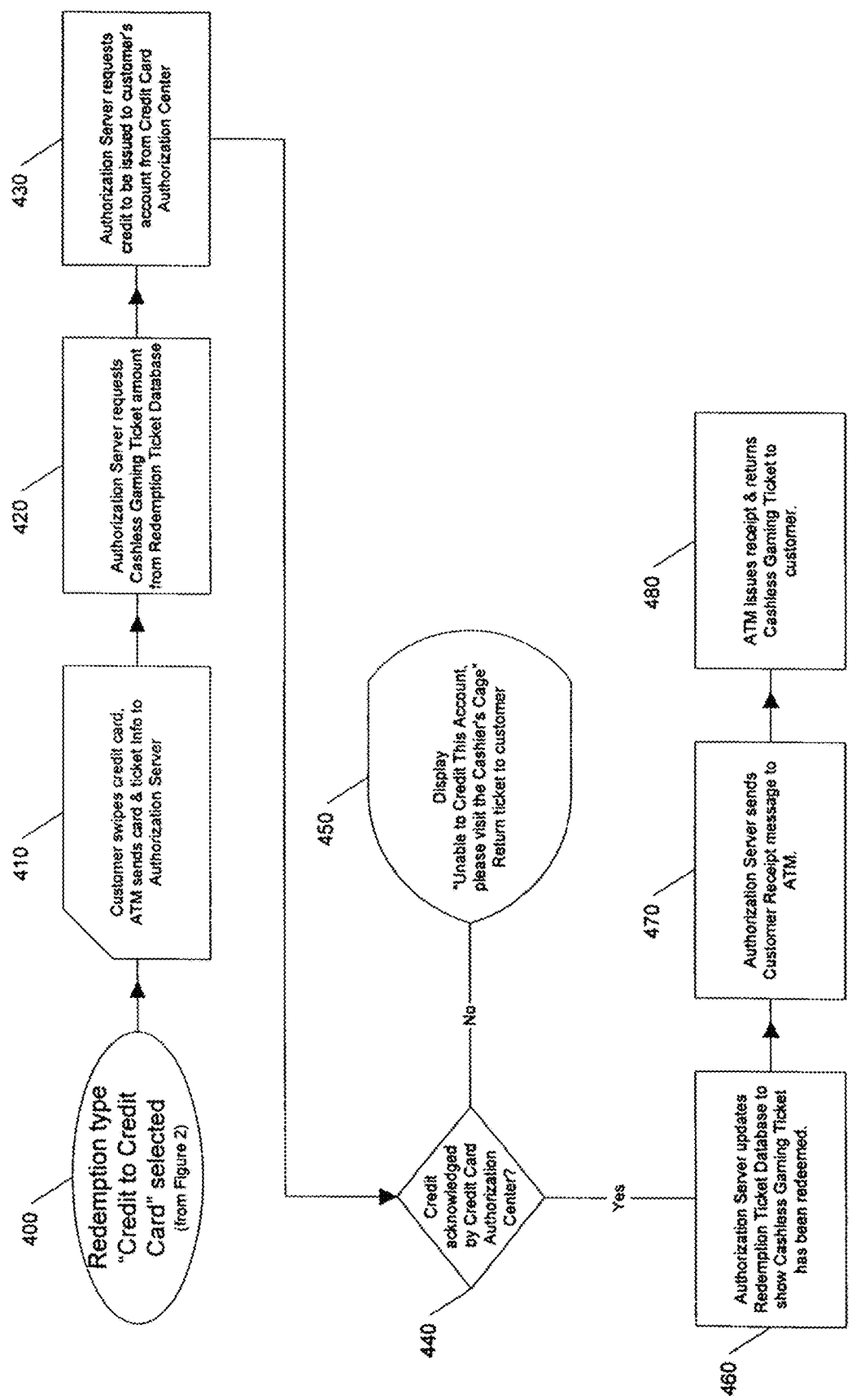
FIG. 4 is a flow diagram of a method for completing a ticket redemption transaction with a credit redemption in accordance with the present invention.

Now with reference to FIGS. 1 and 4, if the player 120 selects the redemption type "Credit to Credit Card," step 400, the ATM 150 proceeds with a credit redemption. Such a redemption may comprise the transfer of funds to a credit card account or other forms of credit linked accounts (e.g. a designated account associated with a credit line/agreement, etc.). The ATM 150 prompts the player 120 to provide a credit card (not shown) belonging to the player. At step 410, the player 120 swipes the credit card through a credit card reader (not shown) of the ATM or otherwise introduces the credit card to the ATM through a method known in the art. In a preferred embodiment, the credit card reader reads the magnetic strip on the credit card, decodes the data therein, and transmits the data to the authorization server 130 as is known in the art. At step 420, as in step 330, the authorization server also determines the player's winnings and the amount that will be awarded.

At step 430, the authorization server 130 electronically issues a credit request to the credit card authorization center 170. The credit request causes the authorization center 170 to attempt to credit a credit card account belonging to the player 120 for the redemption value, the amount of the player's winnings less any commission. If the credit request is successful and the player's credit card account is credited the appropriate amount, the authorization center 170 acknowledges the successful transaction to the authorization server 130. At step 440, the authorization server 130 determines whether the credit request was acknowledged by the authorization center 170. At step 450, if the request was not acknowledged, the ATM 150 displays a message to the player 120 indicating that the credit card account was not credited and that the player 120 may see the cashier (not shown) if the player believes an error has occurred. At step 460, if the request was properly acknowledged and the account was credited, the authorization server 130 updates the redemption ticket database 140 to indicate that the ticket 125 has been redeemed and the player's account has been credited.

At step 470, the authorization server 130 transmits a receipt message to the ATM 150, instructing the ATM to issue a receipt to the player 120 for the transaction. At step 480, the ATM issues a receipt, and returns the ticket 125 if necessary, to the player thereby completing the credit-type redemption of the cashless gaming ticket 125.

Figure 5:
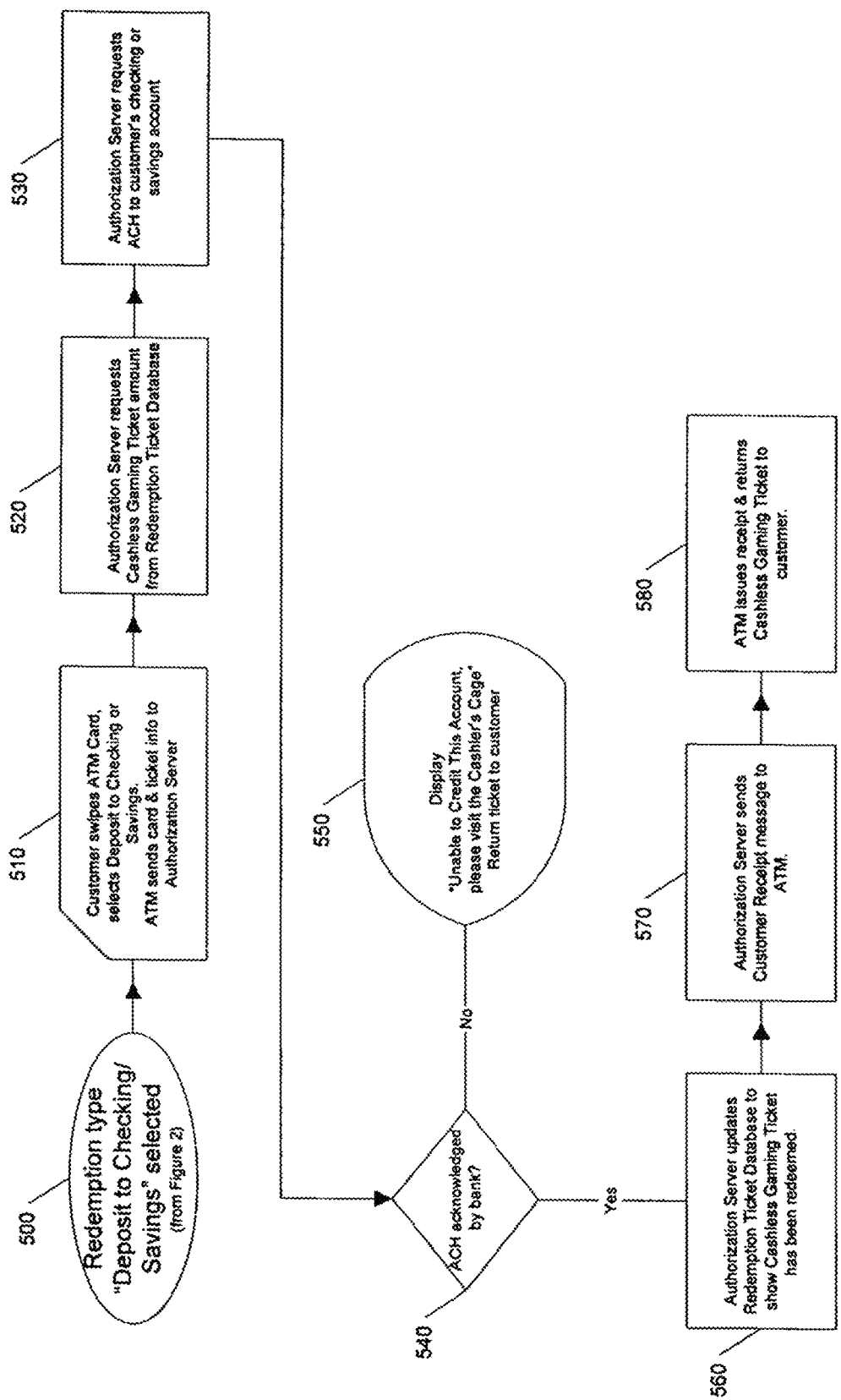
FIG. 5 is a flow diagram of a method for completing a ticket redemption transaction with a deposit redemption in accordance with the present invention.

Now with reference to FIGS. 1 and 5, if the player 120 selects the redemption type "Deposit to Checking/Savings," step 500, the ATM 150 proceeds with a deposit redemption. Such a redemption may comprise the transfer of funds to a checking or savings account or other forms of debit linked accounts (e.g. a designated account associated with deposited funds, etc.). The ATM 150 prompts the player 120 to provide an ATM card (not shown) belonging to the player. At step 510, the player 120 swipes the ATM card through a card reader (not shown) of the ATM or otherwise introduces the ATM card to the ATM through a method known in the art. In a preferred embodiment, the card reader reads the magnetic strip on the ATM card, decodes the data therein, and transmits the data to the authorization server 130 as is known in the art. The ATM 150 prompts the player 120 to select between depositing to a checking account or a savings account that is associated with the ATM card, and the player selects the desired banking account. At step 520, as in step 330, the authorization server also determines the player's winnings and the amount that will be awarded.

At step 530, the authorization server 130 electronically issues a deposit request to an ATM authorization center 170. The deposit request causes the authorization center 170 to attempt to deposit the amount of the player's winnings, less any commission, into the selected banking account. In one embodiment, the transaction initiated by the deposit request is an Automatic Clearing House ("ACH") transaction. If the ACH, or other transaction type, is successful and the player's banking account is credited the appropriate amount, the authorization center 170 acknowledges the successful transaction to the authorization server 130. At step 540, the authorization server 130 determines whether the deposit request was acknowledged. At step 550, if the request was not acknowledged, the ATM 150 displays a message to the player 120 indicating that the banking account was not credited and that the player 120 may see the cashier (not shown) if the player believes an error has occurred. At step 560, if the request was properly acknowledged, the authorization server 130 updates the redemption ticket database 140 to indicate that the ticket 125 has been redeemed and the player's account has been credited.

At step 570, the authorization server 130 transmits a receipt message to the ATM 150, instructing the ATM to issue a receipt to the player 120 for the transaction. At step 580, the ATM issues a receipt, and returns the ticket 125 if necessary, to the player thereby completing the deposit-type redemption of the cashless gaming ticket 125.

Figure 6:
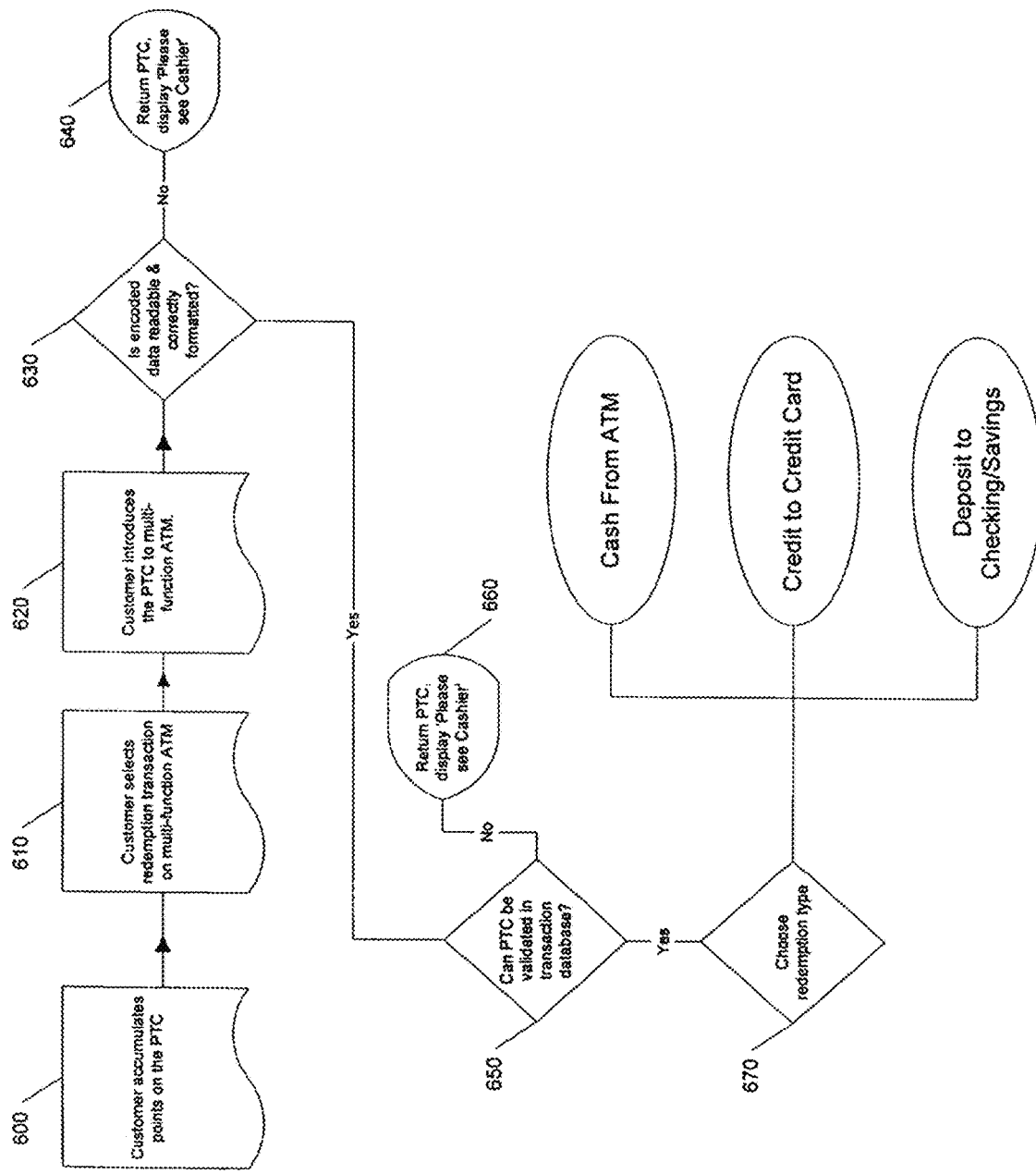
FIG. 6 is a flow diagram of a method for initiating a gaming point redemption transaction on a multi-function ATM in accordance with the present invention.

In another aspect of the present invention, the player 120 may also complete a redemption transaction using a player tracking card ("PTC") (not shown) to receive cash or credit from the multi-function ATM 150. The PTC is a casino-issued card, which is used to track the player's actions in the casino. The casino awards points for certain player actions and associates the points with the PTC on the transaction database 160. The transaction database maintains each players' total award points and increments and decrements the total points according to the players' accumulation and usage of points. The player 120 is able to redeem the points associated with his or her PTC in a similar fashion to the ticket 125. For instance, with reference to FIG. 6, to redeem points the player 120 must first accumulate the points, step 600, through various casino-related activities such as playing gaming machines.

As described herein, when the player 120 is ready to redeem the PTC points for cash or credit, the player selects a redemption transaction on the multi-function ATM 150, step 610. At step 620, the player 120 introduces the PTC to the ATM 150, which reads the PTC. The PTC includes machine readable information, which is stored on the PTC by a storage means such as a magnetic strip, barcode, integrated circuit, digital image, optical memory, or finger imaging. The ATM 150 is configured to read the machine readable information through a means such as a card reader (not shown). If the machine readable information is encoded, the card reader attempts to decode the information into a format usable by the ATM 150. At step 630, the ATM determines whether the machine readable information on the card is readable and correctly formatted. At step 640, if the machine readable information is not readable and correctly formatted, the ATM 150 displays a message to the player 120 indicating the error.

At step 650, if the machine readable information is readable and correctly formatted, the ATM 150 attempts to identify the player 120 and determine whether the PTC can be validated against the transaction database 160 by transmitting the decoded information from the ATM 150 to the authorization server 130. The authorization server 130 then communicates with the transaction database 160 to verify that the PTC is valid and to identify the player 120. At step 660, if the PTC cannot be validated, the ATM 150 displays a message to the player 120 indicating the error.

At step 670, if the PTC is successfully validated, the ATM 150 prompts the player 120 with the choice of transaction types for redeeming the winnings. Upon selection of a transaction type, the ATM proceeds with redeeming the player's points, much like redeeming a player's winnings as described herein and illustrated in FIGS. 3, 4, and 5. The primary functional difference between redeeming winnings through a ticket and redeeming points through a PTC occurs when determining the appropriate award value. Rather than requesting the predetermined dollar value from the redemption ticket database, the ATM 150 requests the number of points associated with the PTC from the transaction database 160 and ensures that the number of points exceeds a minimum threshold or is at least non-zero. For instance, the ATM 150 instructs the authorization server 130 to request the number of points accumulated by the player 120 associated with the PTC in the transaction database 160.

Based on a point-to-dollar conversion provided to the authorization server 130, the server is able to calculate the dollar value represented by the points accumulated by the player 120. The ATM 150 prompts the player 120 to determine whether the he or she wishes to redeem all of the accumulated points or only a portion of the points. Upon determining the number of points to redeem, the ATM proceeds with the redemption transaction in accordance with player's selected transaction type.

Figure 7:
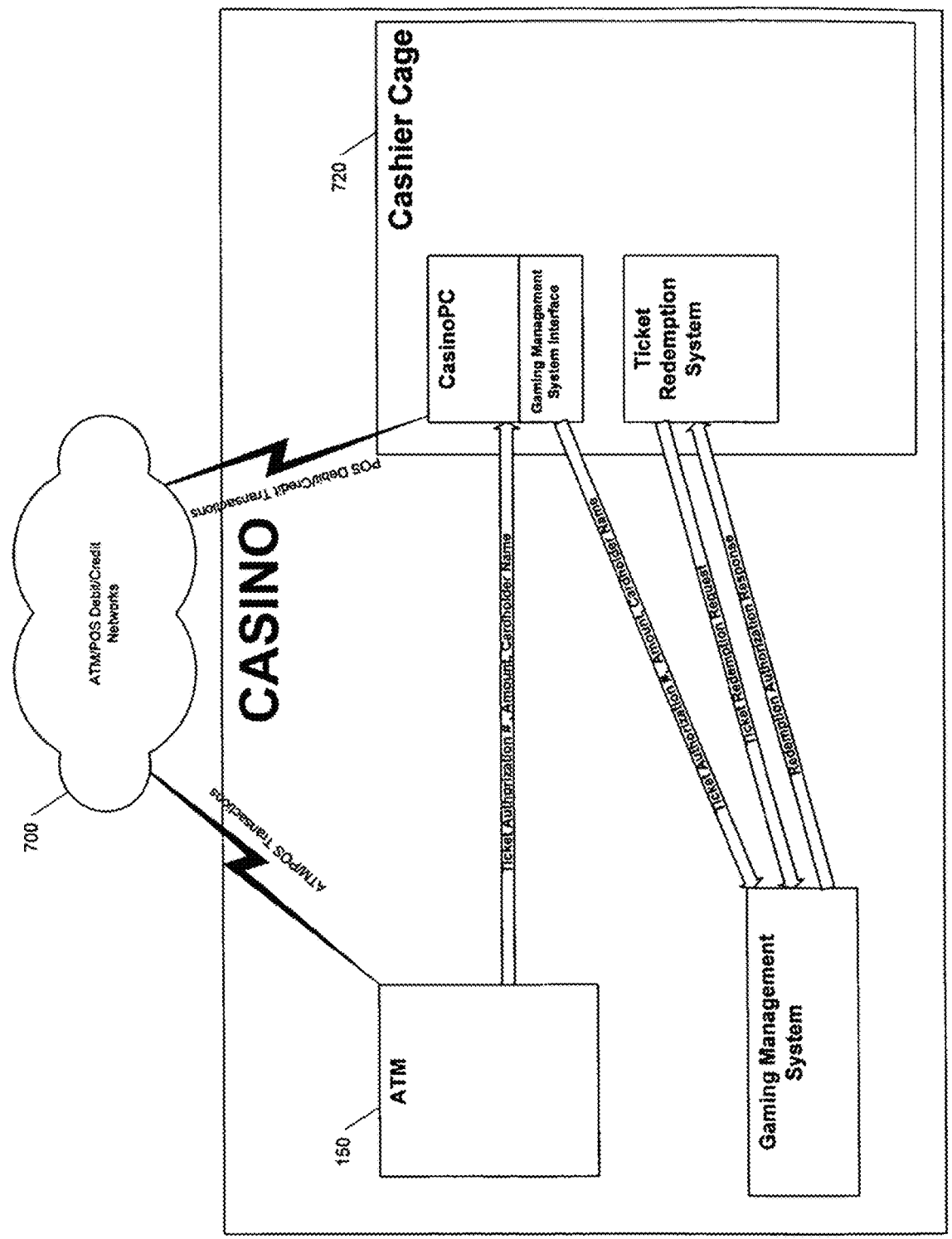
FIG. 7 is a flow diagram of a method for generating a casino ticket transaction on a multi-function ATM in accordance with the present invention.

FIG. 7 provides a flow diagram illustrating another embodiment of the present invention. In this embodiment, the ATM 150 can be used to dispense a casino ticket or other identification card that represents a cash value. In the first step, the casino patron (customer) swipes their identification card (such as a debit card, a credit card, a state issued ID or other identification token) and selects a financial transaction. In this example, the selected financial transaction would be the acquisition of a casino "ticket". Following selection, an amount of money is entered and an account type is selected, such as an ATM and/or POS debit or credit request. In the preferred embodiment, an account type is selected in order to minimize any fees, overhead and/or monetary limits. For example, a POS debit transaction may be preferred because it provides a higher limit withdrawal limit. Once the withdrawal amount and financial account have been collected, the ATM 150 requires confirmation of identity by asking for a secret password, or code or other security device. Once the player 120 confirms his/her identity, the ATM 150 will perform the requested transaction by transmitting request information to the ATM/Credit/POS debit network 700.

In the preferred embodiment, a third party intermediary records audit information associated with any requests and approvals in order to support redemption and anti-fraud detection systems managed by a casino or by the third party intermediary. Following approval of the transaction and creation of an audit trail, a casino ticket (not shown) with the withdrawal value (or some portion thereof) is issued to the player 120 by the ATM 150. In this context, a casino ticket can be any number of identification cards or systems including a paper ticket with a bar code, a magnetic stripe card, a smart card, RFID or other portable digital memory that is encoded with personal and financial information. This casino ticket can then be used on a gaming machine as credit in connection with casino gaming or redeemed for cash. In the preferred embodiment, the customer 120 can either present the casino ticket for validation by a cashier at a cashier cage 720 or insert the casino ticket into a ticket redemption kiosk (including kiosks integrated with one or more casino game machines or other multi-purpose entertainment devices).

FIG. 7 provides a flow diagram illustrating one system that can be used for converting a ATM/POS debit/credit transaction into a negotiable casino ticket. As one skilled in the art would know, such a system provides a number of advantages over the prior art. The casino ticket could be negotiable within different areas (such as a group of mutually linked casinos, restaurants and service providers), to acquire different products or services (such as 50% or more must be used to purchase goods), to trigger different bonuses or awards (free games, discounts, casino points), or any number of features that either limit negotiation or enhance the functionality and features available to the player 120.

For example, a customer/player 120 could link a debit card with a player-tracking card in a casino database such that, whenever that same debit card is used to acquire a casino ticket, the ticket is encoded with that customer's player tracking code or ID. This could further be used to initiate certain security procedures or verifications that are stored in the casino's database and are associated with that player tracking code. A player could be asked to enter certain identification information (something they know, something they have or something they are) on certain types of types of machines. Likewise, gaming features could be provided at casino gaming machines in which such a casino ticket was entered. A customer that has entered a casino ticket onto a game machine could be provided with gaming audio and visual content that is associated with the user in the casino's player tracking/customer database.

Figure 8:
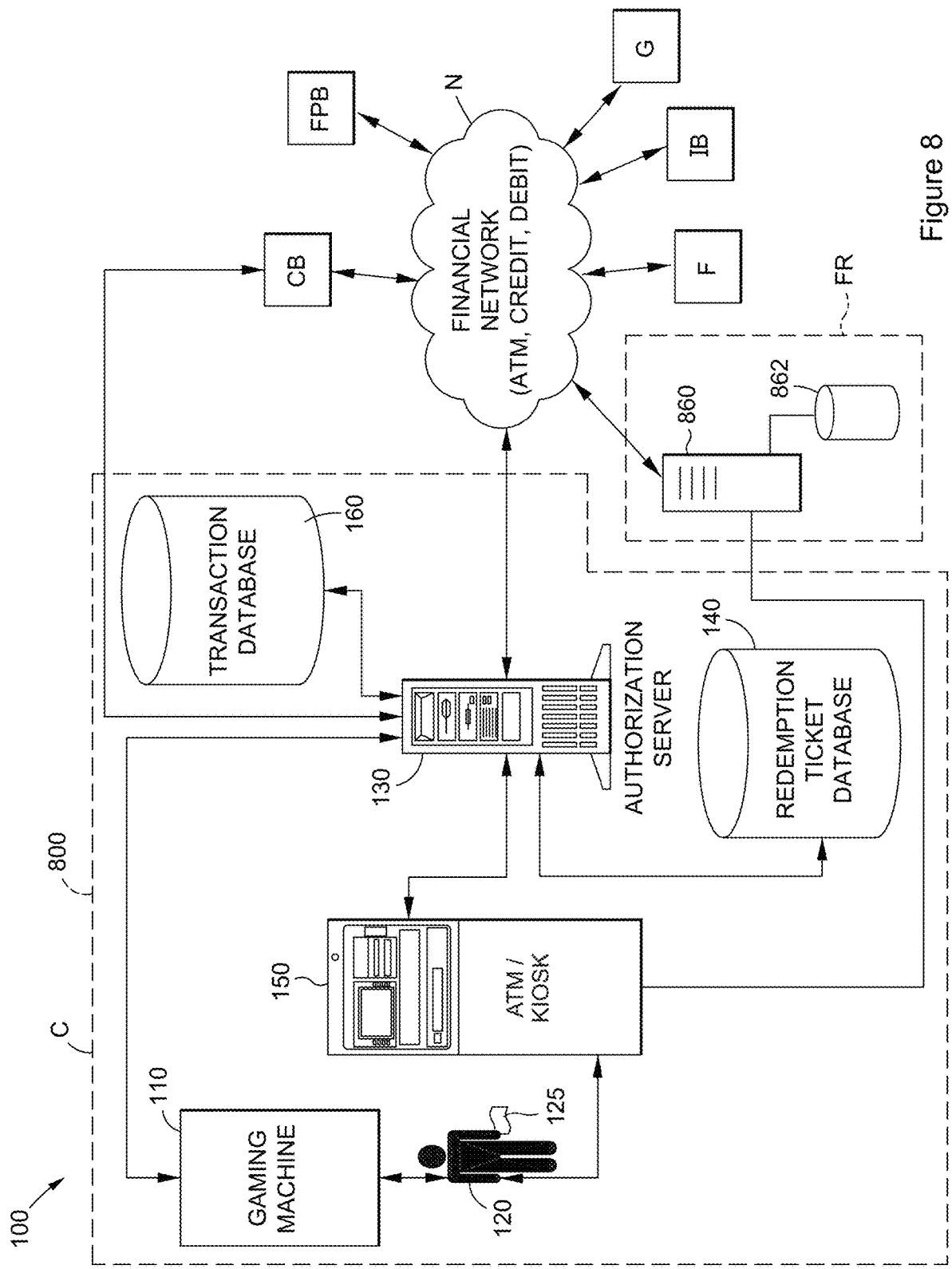
FIG. 8 is a block diagram of a cashless gaming ticket redemption system in accordance with an embodiment of the present invention.

FIG. 8 illustrates another embodiment of a system 800 in accordance with the invention. As illustrated, a casino C (or other establishment at which gaming is offered) may have a number of gaming machines 110, at least one multi-function ATM 150 (which as detailed below, might comply comprise a ticket redemption kiosk or other device), a ticket authorization server 130, a redemption ticket database 140, and a transaction database 142 (which might be associated with the ticket authorization server or a separate accounting server, not shown).

In this embodiment, financial transactions, such as transfers of funds from a redeemed cashless gaming ticket 125 to a bank account of the player 120, may be processed by a financial processor FP. Such a processor might comprise, for example, Everi Payments Inc., of Las Vegas, Nev.

Figure 9:
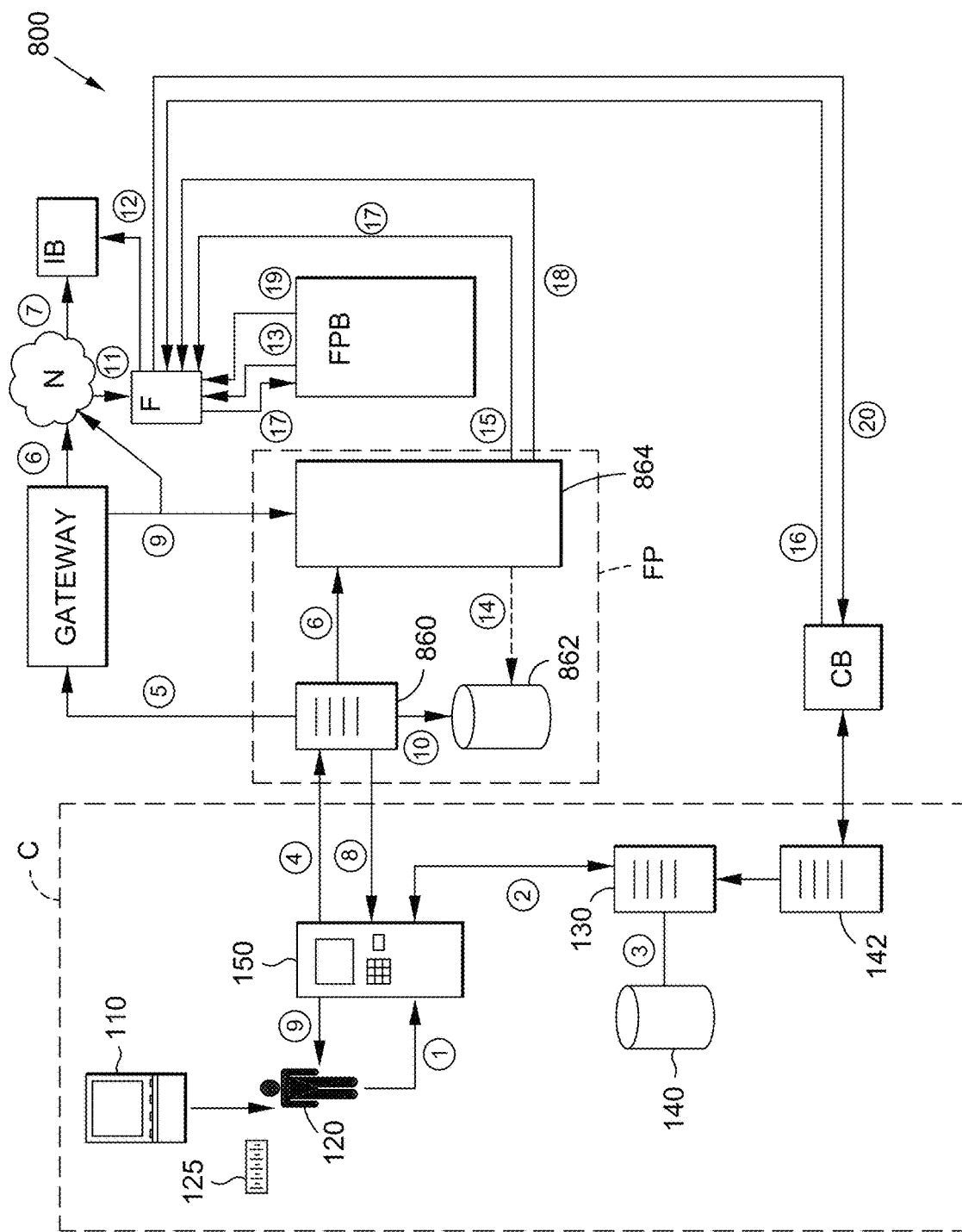
FIG. 9 diagramatically illustrates a flow of the redemption of a cashless gaming ticket to a bank account.

In the illustrated embodiment, the FP has a financial server 860 and an associated database 862, such as a database which stores accounting or other financial transaction data. The FP may also comprise a system 864, as illustrated in FIG. 9 (which might comprise, for example, one or more workstations and one or more servers).

In one embodiment, financial transactions are transacted by one or more elements of a financial network, such as the U.S. banking system. This system may include, but is not limited to, a financial processor bank FPB, the U.S. Federal Reserve F, an issuing bank IB, a gateway G, a network N and a casino bank CB. Of course, the various banks might comprise banks, savings and loans or other financial institutions. Further, various of the entities' banks might be the same bank.

It will be appreciated that in the embodiment illustrated in FIG. 8, cashless gaming tickets are redeemed via a ticketing server or system 130 which is distinct from the financial server 860 that functions to process funds transfer requests from the ticket to the player's financial account. In particular, in this configuration, the financial server 860 may be operated by a financial processor FP which is a vendor or service provider of the casino C (wherein, for example, the financial server 860 may be off-site from the casino C, whereas the ticketing server 130 might be located on-site). Of course, as illustrated in FIG. 1, the functionality of ticket redemption and monetary transactions may be accomplished via a single server or groups of servers, such as where such features are integrated.

One embodiment of a method of processing a gaming ticket 125 to a player's bank account will now be described with reference to FIG. 9. In a step S1, a player 120 may request to redeem a gaming ticking 125 at the ATM 150, such as by making a request to redeem the ticket (such as by selecting a "redeem ticket" or "redeem ticket to my bank card account" optional presented on a display of the ATM) and/or by presenting the gaming ticket 125 to the ATM 150 (such as by inputting the ticket 125 into a ticket reader of the ATM 150 or otherwise presenting the ticket to a scanner or reader of the ATM 150). When the player 120 seeks to redeem the value of the ticket 125 to one of their bank or financial accounts, and preferably an account associated with a bank card (such as VISA® bank card account, although the account might comprise other types of accounts such as a deposit or savings account, investment account, credit account or the like), the player provides their bank or financial account information. This information may be provided in various manners, such as by associating the account information with a player ID which is used by the player at the ATM 150 to identify themselves (thus linking their financial account information), by the player inputting such information, or by the player providing their bank card to the ATM 150 so that the information associated therewith may be read by the ATM, etc. (such as via a magnetic stripe or EMV chip reader thereof).

As described above, the ticket 125 is preferably validated. The ATM 150 may send a validation request (such as using data read from the ticket, such as a ticket ID read from an associated bar code) and transmit that request to the ticket authorization server 130, such as in step S2. As one example, a player might seek to redeem a ticket 125 having a $100 value. The ticket authorization server 130 preferably validates the ticket using ticket information stored in the database 140, such as at step S3. This may comprise determining that the ticket 125 has not previously been redeemed and confirming the value of the ticket. The validation is preferably transmitted back to the ATM 150. If the ticket 125 is not validated, the player may be so informed and the transaction may be ended.

If the ticket 125 is validated, a request may be transmitted from the ATM 150 to the financial server 860 of the financial processor FP to credit the amounts of funds from the ticket to the player's financial account, as in step S4. As noted below, the amount of funds which are credited to the player might comprise the amount or monetary value of the ticket 125 less a transaction fee. As one example, when the player is redeeming a ticket 125 having a monetary value of $100, the player might be charged a $7 transaction fee, whereby the amount of funds which the financial processor FP requests to be credited to the player's account is $93). At step S5, the financial server 860 may send a request for the funds credit to the gateway G for processing of the transaction. The gateway G might comprise a payment platform of a known/existing financial network, as is currently known in the art.

In a step S6, the gateway G generates and sends a request for the credit through the network N (which may again comprise a financial network, one or more portions of which may be public or private, including the Internet). In a step S7, the request is transmitted from the network N to the issuing bank IB (e.g., such as the bank that issued the player's bank card), and the issuing bank IB sends a response back (such as confirming receipt and acceptance of the requested credit).

Assuming that the transaction is confirmed by the issuing bank IB, in a step S8, the player may be notified that the funds have successfully been transferred to their bank card account. This may comprise, financial server 860 receiving transfer confirmation from the gateway G and then transmitting that confirmation to the ATM 150. The ATM 150 may then display the confirmation to the player 120 (such as the message "$93 funds have successfully been credited to your bank card). Of course, if the transaction is not confirmed, such a denial/failure may also be indicated to the player at the ATM 150 (thus allowing them, for example, to simply cash out the ticket into cash, etc.).

In one embodiment, the funds are then settled between the parties via the financial network. In a step S9, the gateway G transmits a settlement file to the financial network N and the financial processor system 864 (such as to the server or one of the workstations) for processing.

In a step S10, reconciliation process details are transmitted from the financial server 860 of the financial processor FP to the financial database 862 for storage. In a step S11, the network N generates and transmits settlement details to the Federal Reserve F. The Federal Reserve F then credits the issuing bank IB by an amount of the transaction (less any service fee charged by the FPB, etc.) in step S12 and debits the bank account of the financial processor FP at the financial processor bank FPB in step S13 (by the amount credited to the player's account, e.g. $93 in this example). In a step S14, the settlement file may be matched with reconciliation details stored in the accounting database 862.

In a step S15, the financial processor FP may request the Federal Reserve F to transfer funds from the casino C. The Federal Reserve F then debits the casino bank CB by the amount of the transaction, such as $100 in this example, at a step S16. This amount is credit to the financial processor bank FPB, such as at step S17 (thus, in this example, $93 was debited from the financial processor's account at the FPB to fund the player's account and then $100 was credited to the financial processor's account from the casino C, thus resulting in a gross revenue of $7 to the financial processor FP).

The financial processor FP or other processor might also share part of the transaction fee with other of the entities. For example, the financial processor FP might pay the casino a portion of each transaction fee (such as $2 of the $7 in this example). As one example, in a step S18, a request might be transmitted from the financial processor FP to the Federal Reserve F (such as from one of the workstations) to transfer such funds from the financial processor FP to the casino C. In a step S19, the Federal Reserve F may deduct the amount of these funds from the account of the financial processor FP at the financial processor bank FPB and then in step S20, those funds may be credited to an account of the casino C at the casino bank CB.

In one embodiment, when a player seeks to redeem a ticket to their financial account, various checks or validations may be performed. For example, the player's bank card is preferably validated (such as by determining that it is associated with a valid account; wherein if the card or account is not valid, the player may be prompted to insert another bank card), along with compliance with maximum transaction amount limits (for example, the financial processor FP might set a maximum transaction limit of $2500, where if the value of the ticket exceeds that amount, the transfer option might be blocked), acceptance of transaction charges by the player, and monetary velocity checks (including daily/weekly/monthly limits). In embodiment, if these checks or validations are not successful, the value of the ticket may be dispensed to the player from the ATM in the form of monetary funds, rather than by transferring the funds to their financial account. Of course, various of the prompts, notices and the like may be displayed to the player via a graphical user interface which is displayed on a display of the ATM.

In the above-described process, funds are directly credited to the player's bank card account using an existing financial processing network, such as an existing credit card network (and wherein the funds are then settled on the back end using existing financial banking networks). In one configuration, this is accomplished by pushing the player's bank card number to the gateway G using banking merchant category code 7995 to facilitate a "gambling" financial transaction in the financial network.

In other embodiments, funds might be indirectly credited to a player's financial account via a sweep wallet account. Such a transaction configuration might be utilized, for example, if MCC 7995 transactions are not supported or permitted.

In this alternate configuration, the transaction as it appears to the player is the same. However, when the financial processor FP receives the transaction request, the financial processor FP does not transmit a transaction request to the gateway G (such as via an MCC 7995 process as noted above). Instead, the financial processor FP may send a transaction request to a "wallet" bank WB (which could be the financial processor bank FPB or a third party bank). This request may include information regarding the transaction, such as the card data (including the financial account/card number) and/or other information (in the case where the transaction is processed using MCC 6012 as described below, preferably the information that is required for processing such a transaction is transmitted from the financial processor FP to the wallet bank WB). The wallet bank WB may create a non-reloadable sweep wallet account for the requested transaction, where the account number for the wallet/account may be created from the transmitted information. The wallet bank WB may then send a transaction request to the gateway G (and thereon to the issuing bank IB, as in the process described above), to process the transaction. This transaction request may be made using a different merchant category code, such as MCC 6012. The transaction may then be processed and reconciled in a similar manner to that described above.

In either embodiment of the above-described process, funds associated with a ticket 125 that is presented by a player for cash-out to their bank card account via a process in which funds are transferred directly to their account.

It will be appreciated that while a multi-function ATM may be used to facilitate a transfer of funds from a presented ticket to a player's financial account (such as via crediting to a player's credit card or deposit to the player's bank account), other devices might be used. For example, relative to the system 800 just described, instead of a multi-function ATM, a kiosk might be utilized. Such a kiosk might have similar functionality to the multi-function ATM, except that it might not be configured to dispense cash at all. Instead, the kiosk might only be configured to receive and process a presented ticket and transfer funds to a financial account, and/or provide other functionality (such as to receive paper currency and allow transfer/deposit of the currency funds, break the currency into other denomination, etc.). Thus, the term "ATM" as used herein, except as otherwise indicated, may include devices such as kiosks or the like which don't include the functionality of dispensing cash based upon a transfer or access of funds from a remote location (such as a credit or debit account).

This embodiment provides a number of advantages. The casino ticket provides a simple financial tool that is highly managed from both an access standpoint (through dynamic security), from a negotiation standpoint (where it can be used and how) that is still highly portable and personalized.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. For instance, the redemption types include not only cash/credit/deposit, but they may include any redemption type practicable on an ATM. Similarly, the unique identifier on the tickets is not limited to barcodes, but may take any form known in the art. Accordingly, the present invention is not limited in the particular embodiments, which have been described in detail therein. Rather, reference should be made to the appended claims as indicative of the scope and content of the present invention.

What is claimed is:

1. A method for redeeming a cashless gaming ticket, the method comprising:
   receiving a cashless gaming ticket comprising encoded data representing a unique identifier associated with the cashless gaming ticket at a multi-function automated teller machine ("ATM") via a ticket reading device at the multi-function ATM and reading the unique identifier from the encoded data;
   validating the unique identifier by sending the unique identifier read at the multi-function ATM for comparison against codes in a redemption ticket database and receiving validation of the unique identifier at the multi-function ATM including information regarding a monetary value associated with the unique identifier;
   receiving an input via an input device at the multi-function ATM to conduct a redemption to a bank card account transaction;
   receiving bank card information at the multi-function ATM via a card reading device and transmitting a request for transfer of funds to said bank card account to a financial server;
   receiving at said financial server said request for transfer of funds;
   transmitting, from the financial server to a financial network, a request for said monetary value less a transaction fee to be credited to said bank card account of said player receiving confirmation at the financial server when the credit is applied to the bank card account; and
   confirming at the multi-function ATM that the credit is applied to the bank card account.

2. The method according to claim 1, wherein said multi-function ATM transmits a validation request to a ticket authorization server.

3. The method according to claim 1, wherein said financial server transmits said request for said monetary value less said transaction fee to be credited via a financial gateway to an issuing bank associated with said bank card account.

4. The method according to claim 3, wherein said request is made via merchant category code 7995.

5. The method according to claim 1, wherein the cashless gaming ticket is issued from a gaming machine operated by a casino.

6. The method according to claim 5, further comprising said financial server transmitting a request to said financial network a request to transfer an amount comprising a portion of said transaction fee to a bank of said casino.

7. The method according to claim 1, wherein said financial server transmits said request for said monetary value less said transaction fee to be credited to a processing bank which creates a wallet account for said transaction and transfers funds from said wallet account to an issuing bank associated with said bank card account.

8. The method according to claim 7, wherein said transfer of funds from said wallet account to said issuing bank is made via merchant category code 6012.

9. The method according to claim 1, wherein when the confirmation is not received, displaying a message at a display of the multi-function ATM indicating that the credit has not been applied to the account.

10. A system for redeeming a cashless gaming ticket, the system comprising:
a gaming machine that presents one or more games to a user, the gaming machine being configured to issue a cashless gaming ticket to the user, the cashless gaming ticket comprising a encoded data including a unique identifier and having associated monetary value;
a ticket redemption system communicatively coupled with the gaming machine, the ticket redemption system including a ticket database of unique identifiers and associated monetary values and configured to validate tickets;
a multi-function ATM comprising at least one display, a ticket reading device and a card reading device, said ATM configured to transmit a ticket validation request to said ticket redemption system in response to presentation of the cashless gaming ticket by said user and to transmit a request to transfer said monetary value associated with said cashless gaming ticket to a bank card account associated with a bank card presented to said ATM by said user; and
a financial server, said financial server configured to receive the request to transfer monetary value from said ATM, to transmit to a financial network a request for said monetary value less a transaction fee to be credited to said bank card account of said user, to receive confirmation that the credit is applied to the bank card account, and when said confirmation is received, to cause said ATM to indicate to said user that the credit was successfully applied to the bank card account.

11. The system according to claim 10, wherein said financial server transmits said request for said monetary value less said transaction fee to be credited via a financial gateway to an issuing bank associated with said bank card account.

12. The system according to claim 11, wherein said request is made via merchant category code 7995.

13. The system according to claim 10, wherein said gaming machine is operated by a casino.

14. The system according to claim 13, further comprising said financial server transmitting a request to said financial network a request to transfer an amount comprising a portion of said transaction fee to a bank of said casino.

15. The system according to claim 10, wherein said financial server transmits said request for said monetary value less said transaction fee to be credited to a processing bank which creates a wallet account for said transaction and transfers funds from said wallet account to an issuing bank associated with said bank card account.

16. The system according to claim 15, wherein said transfer of funds from said wallet account to said issuing bank is made via merchant category code 6012.

17. The system according to claim 10, wherein when the confirmation is not received, displaying a message at a display of the ATM indicating that the credit has not been applied to the account.

18. A system for redeeming cashless gaming tickets comprising:
a multi-function ATM comprising at least one display, a ticket reading device and a card reading device, said ATM configured to transmit a ticket validation request to a ticket redemption system in response to presentation of a cashless gaming ticket to said ATM by a user, said cashless gaming ticket having associated monetary value, and when said cashless gaming ticket is validated and said ATM has received a request by said user to transfer said monetary value to a bank card account associated with a bank card, to read said bank card and transmit a request to transfer said monetary value associated with said cashless gaming ticket to said bank card account; and
a financial server, said financial server configured to receive the request to transfer monetary value from said ATM, to transmit to a financial network a request for said monetary value less a transaction fee to be credited to said bank card account of said user, to receive confirmation that the credit is applied to the bank card account, and when said confirmation is received, to cause said ATM to indicate to said user that the credit was successfully applied to the bank card account.

19. The system according to claim 18, wherein said financial server transmits said request for said monetary value less said transaction fee to be credited via a financial gateway to an issuing bank associated with said bank card account.

20. The system according to claim 19, wherein said request made via merchant category code 7995.

\* \* \* \* \*